(12) United States Patent
Bhatt et al.

(10) Patent No.: US 10,679,330 B2
(45) Date of Patent: Jun. 9, 2020

(54) SYSTEMS AND METHODS FOR AUTOMATED INFERENCING OF CHANGES IN SPATIO-TEMPORAL IMAGES

(71) Applicant: TATA CONSULTANCY SERVICES LIMITED, Mumbai (IN)

(72) Inventors: Prakruti Vinodchandra Bhatt, Thane (IN); Sanat Sarangi, Thane (IN); Srinivasu Pappula, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 106 days.

(21) Appl. No.: 16/022,239

(22) Filed: Jun. 28, 2018

(65) Prior Publication Data
US 2019/0220967 A1 Jul. 18, 2019

(30) Foreign Application Priority Data

Jan. 15, 2018 (IN) .............................. 201821001685

(51) Int. Cl.
 *G06T 7/00* (2017.01)
 *G06N 3/08* (2006.01)
 *G06K 9/62* (2006.01)

(52) U.S. Cl.
 CPC .......... *G06T 7/0002* (2013.01); *G06K 9/6218* (2013.01); *G06K 9/6271* (2013.01);
 (Continued)

(58) Field of Classification Search
 CPC ......... G01S 17/06; G01T 1/29; A61N 5/1049; G06T 7/0016; G06F 9/3004; A61B 6/03;
 (Continued)

(56) References Cited

U.S. PATENT DOCUMENTS

2005/0105775 A1* 5/2005 Luo .................... G06K 9/00664
 382/115
2017/0351933 A1 12/2017 Bleiweiss
2019/0035159 A1* 1/2019 Tran ........................ G06F 3/013

FOREIGN PATENT DOCUMENTS

IN 2011/MUM/02651 9/2012

OTHER PUBLICATIONS

Halimatu Sadiyah et al. ,"Advances of image processing in Precision Agriculture: Using deep learning convolution neural network for soil nutrient classification," *Journal of Multidisciplinary Engineering Science and Technology (JMEST)*, Aug. 2017, vol. 4, Issue 8, available at http://www.jmest.oro/wp-content/uploads/JMESTN42352362.pdf.

(Continued)

*Primary Examiner* — Phuoc H Doan
(74) *Attorney, Agent, or Firm* — Finnegan, Henderson, Farabow, Garrett & Dunner LLP (57) ABSTRACT

The present disclosure addresses the technical problem of enabling automated inferencing of changes in spatio-temporal images by leveraging the high level robust features extracted from a Convolutional Neural Network (CNN) trained on varied contexts instead of data dependent feature methods. Unsupervised clustering on the high level features eliminates the cumbersome requirement of labeling the images. Since models are not trained on any specific context, any image may be accepted. Real time inferencing is enabled by a certain combination of unsupervised clustering and supervised classification. A cloud-edge topology ensures real time inferencing even when connectivity is not available by ensuring updated classification models are deployed on the edge. Creating a knowledge ontology based on adaptive learning enables inferencing of an incoming image with (Continued)

varying levels of precision. Precision farming may be an application of the present disclosure.

18 Claims, 7 Drawing Sheets

(52) U.S. Cl.
CPC ...... *G06N 3/08* (2013.01); *G06T 2207/20036* (2013.01); *G06T 2207/20084* (2013.01)

(58) Field of Classification Search
CPC . A61B 5/0261; A61B 5/6886; A61B 5/02427; A61B 5/725; A61B 5/7278
USPC ............................ 382/128, 159, 131; 348/80
See application file for complete search history.

(56) References Cited

OTHER PUBLICATIONS

Kriti Bhargava et al., "Using Edge Analytics to Improve Data Collection in Precision Dairy Farming", *2016 IEEE 41st Conference on Local Computer Networks Workshops* (*LCN Workshops*), Nov. 7-10, 2016, available at https://www.researchgate.net/profile/Kriti_Bhargava2/publication/309592632_Using_Edge_Analytics_to_Improve_Data_Collection_in_Precision_Dairy_Farming/links/59de7785458515376b29e1e9/Using-Edge-Analytics-to-Improve-Data-Collection-in-Precision-Dairy-Farming.pdf.

\* cited by examiner

SYSTEMS AND METHODS FOR AUTOMATED INFERENCING OF CHANGES IN SPATIO-TEMPORAL IMAGES

PRIORITY CLAIM

This U.S. patent application claims priority under 35 U.S.C. § 119 to: Indian Patent Application No. 201821001685, filed on 15 Jan. 2018. The entire contents of the aforementioned application are incorporated herein by reference.

TECHNICAL FIELD

The disclosure herein generally relates to image processing and classification, and more particularly relates to systems and methods for automated inferencing of changes in spatio-temporal images.

BACKGROUND

Developing a system that can learn and adapt to computer vision requirements with minimal human intervention for a given agricultural scenario is a complex task. Such capabilities are however required for Internet of things (IoT) deployments especially with cameras that are used for continuous monitoring of plants. The challenge specifically is to track events associated with biological processes of plants such as those associated with growth and health. Timely and localized identification of growth stage or a health condition at a particular stage is very important to improve yield. Given the different variety of crops, their growth patterns and difference in manifestations in physical appearances due to aging or external factors such as a disease or deficiency, it is non-trivial to identify and flag only the changes in the appearance of a crop during its life cycle. The ability to do this however is essential, for example, in order to tag and forward essential events from image acquisition systems at the farm to the cloud instead of periodically forwarding redundant images.

Image classification typically involves a major challenge of human intervention for labeling image datasets for supervised classification. Deep Convolutional Neural Networks (CNNs) have proved to give a higher accuracy for feature extraction. They however need a large amount of labeled dataset to train classification models.

For IoT deployments involving camera sensors or equivalent participatory sensing scenarios, configuring a computer vision solution to meet specific sensing requirements of the context being monitored becomes a challenge. Moreover, carrying out real time interpretation of an image submitted to an IoT platform for processing at the edge is a challenge where connectivity is not easily available, especially in rural areas of developing countries.

SUMMARY

Embodiments of the present disclosure present technological improvements as solutions to one or more of the above-mentioned technical problems recognized by the inventors in conventional systems.

In an aspect, there is provided a processor implemented method comprising: receiving a plurality of images, at one or more time intervals, pertaining to a context under consideration, the received images being correlated and associated with at least one of a spatial and temporal information; intelligently identifying and transmitting, at the one or more time intervals, at least a subset of the received images based on the spatial or temporal information and an adaptive threshold; extracting features from the received images, by forward passing the received images through a neural network model pre-trained on a dataset of a plurality of images pertaining to varied contexts; performing a first level of inferencing, by clustering the received images into one or more classes using the extracted features, the step of clustering comprising: determining an optimal number of the one or more classes using a Silhouette coefficient; identifying the one or more classes based on similarity detected between the received images by performing at least one of: computing a first distance measure represented by a spherical distance of each of the received images with every other image in the received images; computing a likelihood of each image in the received images to belong to a class using a class distribution based on a Maximum A Posteriori probability (MAP); and computing a second distance measure represented by a spherical distance between each of the received images and a centroid of each of the one or more classes; wherein the number of the one or more classes equals the determined optimal number; and validating the quality of the one or more classes using one or more of an Normalized Mutual Information (NMI) score, a Rand Index and a purity measure; and associating the one or more classes with a tag based on the context under consideration.

In another aspect, there is provided a system comprising: one or more internal data storage devices operatively coupled to one or more hardware processors for storing instructions configured for execution by the one or more hardware processors, the instructions being comprised in: an input module configured to: receive a plurality of images, at one or more time intervals, pertaining to a context under consideration, the received images being correlated and associated with at least one of a spatial and temporal information; and intelligently identify and transmit, at the one or more time intervals, at least a subset of the received images based on the spatial or temporal information and an adaptive threshold; a feature extractor configured to extract features from the received images, by forward passing the received images through a neural network model pre-trained on a dataset of a plurality of images pertaining to varied contexts; a clustering module configured to perform a first level of inferencing by clustering the received images into one or more classes using the extracted features, the step of clustering comprising: determining an optimal number of the one or more classes using a Silhouette coefficient; identifying the one or more classes based on similarity detected between the received images by performing at least one of: computing a first distance measure represented by a spherical distance of each of the received images with every other image in the received images; computing a likelihood of each image in the received images to belong to a class using a class distribution based on a Maximum A Posteriori probability (MAP); and computing a second distance measure represented by a spherical distance between each of the received images and a centroid of each of the one or more classes; wherein the number of the one or more classes equals the determined optimal number; and validating the quality of the one or more classes using one or more of an Normalized Mutual Information (NMI) score, a Rand Index and a purity measure; and associating the one or more classes with a tag based on the context under consideration.

In yet another aspect, there is provided a computer program product comprising a non-transitory computer readable medium having a computer readable program embodied therein, wherein the computer readable program, when executed on a computing device, causes the computing device to: receive a plurality of images, at one or more time intervals, pertaining to a context under consideration, the received images being correlated and associated with at least one of a spatial and temporal information; intelligently identify and transmit, at the one or more time intervals, at least a subset of the received images based on the spatial or temporal information and an adaptive threshold; extract features from the received images, by forward passing the received images through a neural network model pre-trained on a dataset of a plurality of images pertaining to varied contexts; perform a first level of inferencing, by clustering the received images into one or more classes using the extracted features, the step of clustering comprising: determining an optimal number of the one or more classes using a Silhouette coefficient; identifying the one or more classes based on similarity detected between the received images by performing at least one of: computing a first distance measure represented by a spherical distance of each of the received images with every other image in the received images; computing a likelihood of each image in the received images to belong to a class using a class distribution based on a Maximum A Posteriori probability (MAP); and computing a second distance measure represented by a spherical distance between each of the received images and a centroid of each of the one or more classes; wherein the number of the one or more classes equals the determined optimal number; and validating the quality of the one or more classes using one or more of an Normalized Mutual Information (NMI) score, a Rand Index and a purity measure; and associate the one or more classes with a tag based on the context under consideration.

In an embodiment of the present disclosure, the input module is further configured to obtain at least some metadata associated with the received images; and update the metadata associated with the received images based on the associated tags.

In an embodiment of the present disclosure, the system explained above further comprises a pre-processing module configured to pre-process the received images, prior to extracting the features, by performing at least one of (i) a first level of pre-processing, to enhance quality of the received images, by performing one or more of normalization, Principal Components Analysis (PCA) whitening, brightness correction, standardization and segmentation; and (ii) a second level of pre-processing, to adapt the received images for forward passing to the neural network model, by performing one or more of rotation, cropping, shifting, scaling and zooming.

In an embodiment of the present disclosure, the feature extractor is further configured to append the features extracted by the neural network model, with additional features including morphological features and color related features to derive a master feature set; and compress the master feature set using dimensionality reduction methods.

In an embodiment of the present disclosure, the clustering module is further configured to perform the first level of inferencing within one or more of the one or more classes.

In an embodiment of the present disclosure, the system explained above further comprises a classification module configured to perform a second level of inferencing by classifying the one or more classes into one or more sub-classes, the step of classifying comprising: obtaining a plurality of pre-trained tagger models associated with one or more sub-classes corresponding to one or more classes pertaining to the context under consideration, wherein the pre-trained tagger models are trained by the master feature set; classifying the one or more classes from the first level of inferencing into the one or more sub-classes based on the plurality of pre-trained tagger models; computing a confidence level for the classified one or more sub-classes; re-training the plurality of pre-trained tagger models with the images associated with the confidence level below a pre-defined threshold to obtain a plurality of classification models; and creating a knowledge ontology of the classifications models based on the one or more classes, the one or more sub-classes therein and the inter-relationships thereof.

In an embodiment of the present disclosure, the classification module is further configured to evaluate the received images associated with the confidence level below the pre-defined threshold with the associated metadata, prior to re-training the pre-trained tagger models.

In an embodiment of the present disclosure, the system explained above further comprises a database configured to store the received images and the metadata associated thereof; the one or more classes; the one or more sub-classes, the plurality of classification models and the knowledge ontology.

In an embodiment of the present disclosure, the input module is further configured to intelligently identify and transmit at least a subset of the received images by performing one or more of: determining whether the received images are valid based on an entropy value associated thereof; and comparing the received images with a pre-determined number of previous images to determine whether the received images fit into the one or more sub-classes associated thereof, wherein the pre-determined number of previous images is the adaptive threshold based on the context under consideration.

In an embodiment of the present disclosure, the system is configured in a cloud-edge topology having (i) the input module serving as an IoT gateway; (ii) the clustering module, the classification module, the pre-trained tagger models and the database are implemented as cloud based devices; (iii) the pre-processing module is implemented both as a cloud end device as well as an edge end device; and (iv) the feature extractor and the classification models are implemented as cloud end devices and are deployed on the edge end such that the edge end is updated with a current version thereof.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure provides an end to end distribution framework that analyzes correlated images for a particular context and derives relevant inferences. The context may pertain to agriculture, traffic, security surveillance, livestock monitoring, monitoring health of structures, and the like. Although the description hereinafter is provided with reference to the agricultural context, it may be understood that the systems and methods described hereinafter may be applied to any such context without departing from the spirit of the disclosure.

In the context of the present disclosure, the expression "correlated images" refers to contextually related images. Again, the expression "spatio-temporal images" referred hereinafter relates to images collected in a particular space over a given time. It may be noted that the expression "images", in the context of the present disclosure refers to still images obtained directly or extracted from videos.

Deep Convolutional Neural Networks (CNNs) are proven to provide robust features than enable supervised classification. However, a large database of context specific data that is tagged by human intervention is needed. It is also imperative that images provided for classification are captured in controlled environments and models used for classification be trained on specific data without which supervised classification may not be possible. Real-time monitoring of connected devices is fundamental for collecting data. Such collected real-time data holds extremely valuable insights for applications like precision farming. Systems and methods of the present disclosure facilitate intelligent tagging of the collected data in the form of images for a given context, at the source, to allow inferencing in a scalable fashion, scalability being associated with not only the number of images that the systems and methods of the present disclosure can handle and possible hierarchy of classifications but also possible classes of images that may be handled. Challenges faced in robust feature calculation of images captured through different cameras and taken in uncontrolled conditions are also addressed. The present disclosure facilitates automated inferencing of changes in spatio-temporal images by a certain combination of unsupervised and supervised categorization. Systems and methods of the present disclosure also enable real time inferencing of an image obtained on an edge in absence of connectivity.

Referring now to the drawings, and more particularly to FIGS. 1 through 7, where similar reference characters denote corresponding features consistently throughout the figures, there are shown preferred embodiments and these embodiments are described in the context of the following exemplary system and method.

Figure 1:
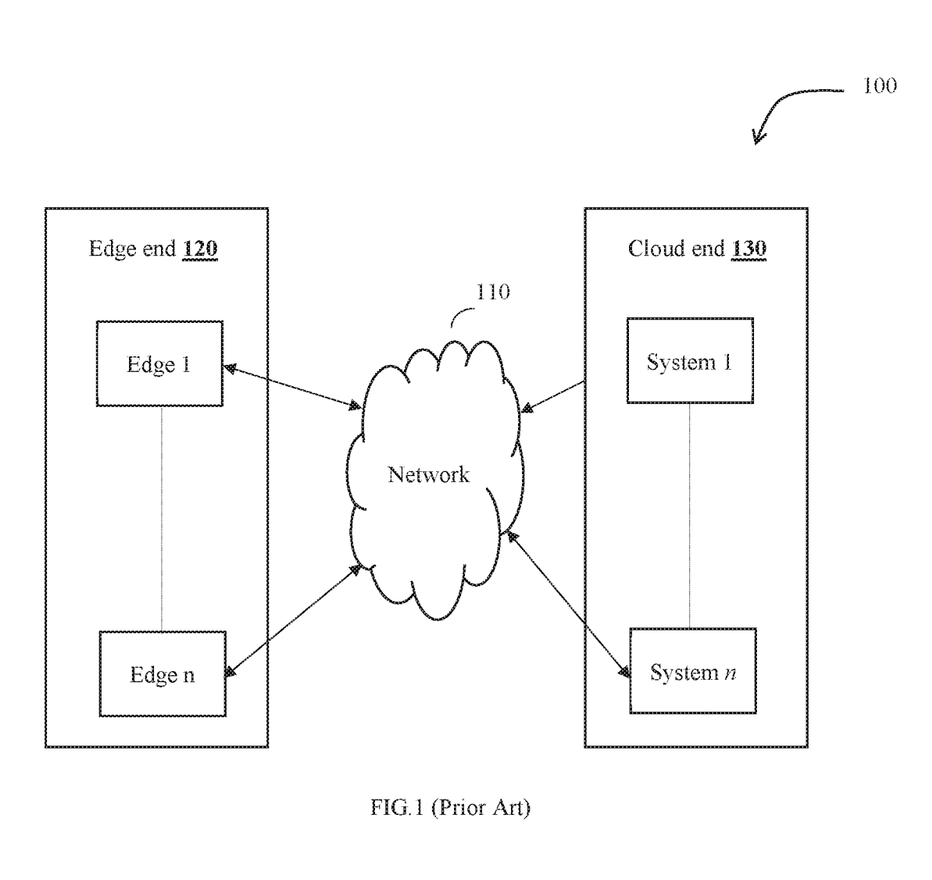
FIG. 1 illustrates an exemplary schematic representation of a cloud-edge topology, as known in the art.
Figure 2:
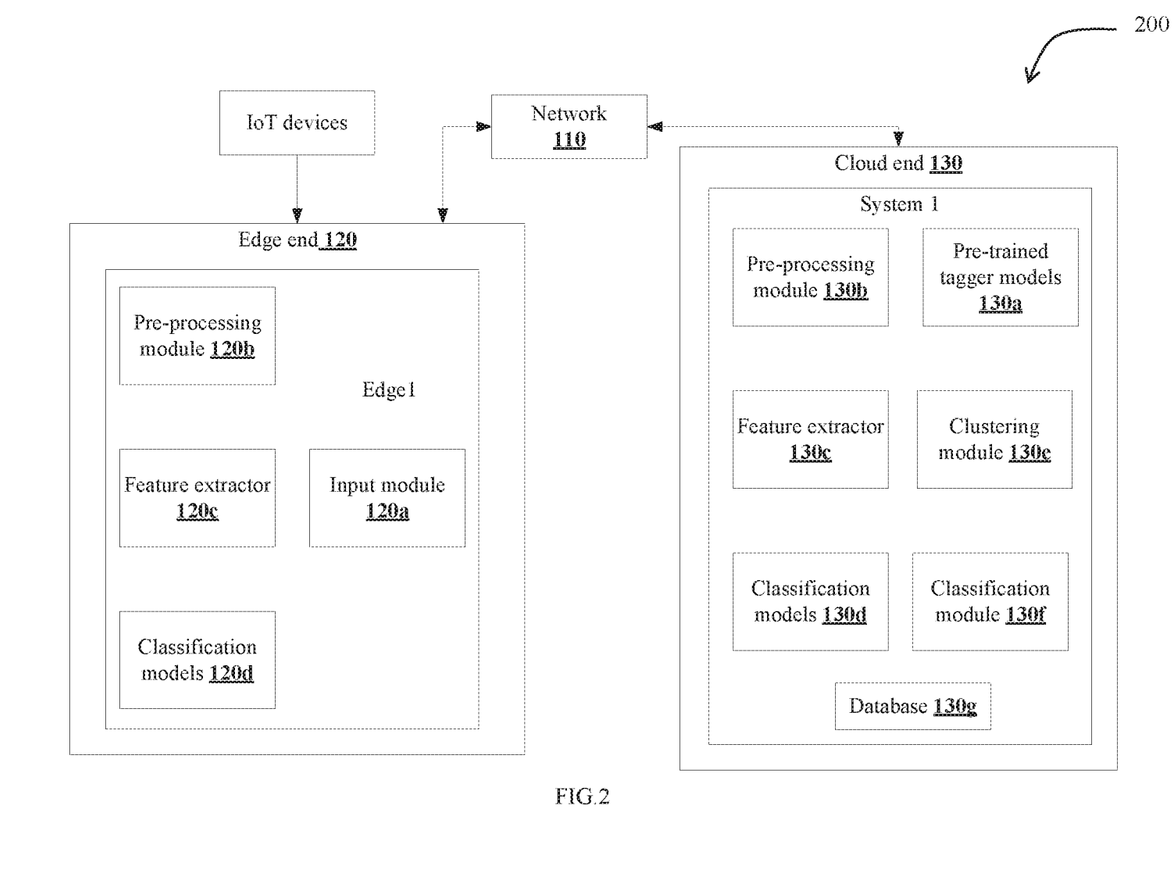
FIG. 2 illustrates an exemplary block diagram with functional modules of a system for automated inferencing of changes in spatio-temporal images that may be configured in the cloud-edge topology of FIG. 1, in accordance with an embodiment of the present disclosure.

FIG. 1 illustrates an exemplary schematic representation of a cloud-edge topology 100, as known in the art, and FIG. 2 illustrates an exemplary block diagram with functional modules of a system 200 for detection of faults in deceptive signals and computing severity thereof, in accordance with an embodiment of the present disclosure. In an embodiment, system 200 can reside on one or more computers and include one or more processors (not shown), communication interface or input/output (I/O) interface (not shown), and memory or one or more internal data storage devices (not shown) operatively coupled to the one or more processors. The one or more internal data storage devices may be interchangeably referred to as memory or database in the context of the present disclosure. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory for execution of steps of the method 300 of the present disclosure illustrated in the form of an exemplary flow diagram in FIG. 7.

In an embodiment, system 200 can be implemented involving a variety of computing systems, such as a laptop computer, a desktop computer, a notebook, a workstation, a mainframe computer, a server, a network server, cloud, hand-held device and the like. Computing systems constituting client 120 are in communication with computing systems constituting server 130 via any type of network 110. The I/O interface can include a variety of software and hardware interfaces, for example, a web interface, a graphical user interface, and the like and can facilitate multiple communications within a wide variety of networks 110 and protocol types, including wired networks, for example, LAN, cable, etc., and wireless networks, such as WLAN, cellular, or satellite. In an embodiment, the I/O interface can include one or more ports for connecting a number of devices to one another or to another server. The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory can include local memory employed during actual execution of program code, bulk storage, and cache memories which provide temporary storage of at least some program code in order to reduce the number of times code must be retrieved from bulk storage during execution. In an embodiment, the various functional modules (Refer FIG. 2) of system 200 can be stored in the memory.

Figure 3:
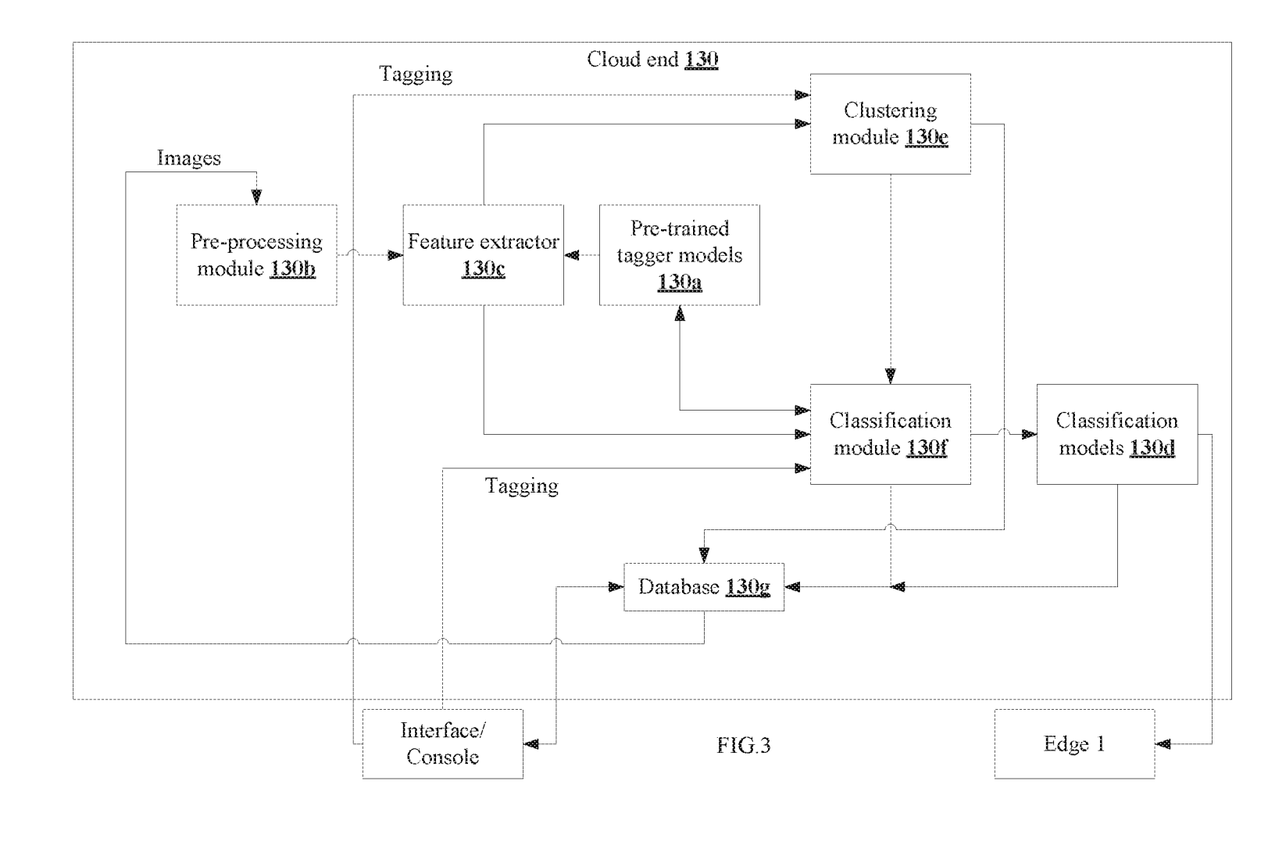
FIG. 3 illustrates an exemplary block diagram of the functional modules implemented at the cloud end of the system of FIG. 2 and their interconnections, in accordance with an embodiment of the present disclosure.
Figure 4:
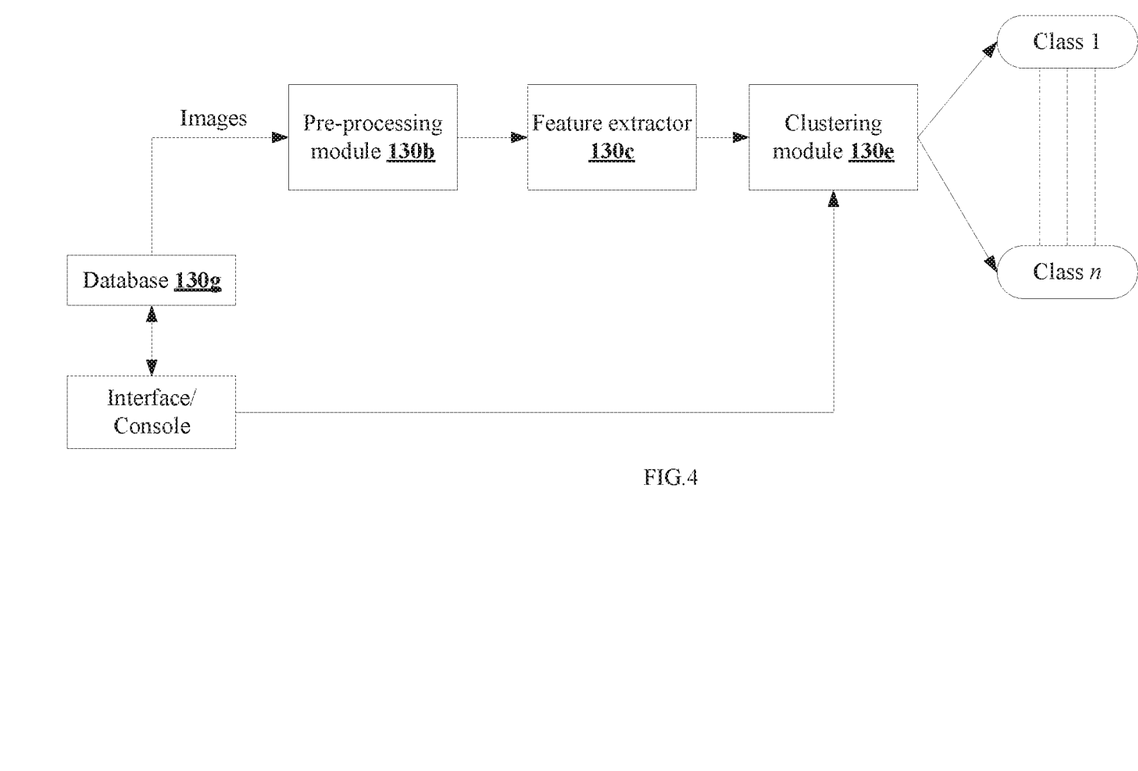
FIG. 4 illustrates an exemplary block diagram illustrating the method flow involved in the step of performing a first level of inferencing, in accordance with an embodiment of the present disclosure.
Figure 5:
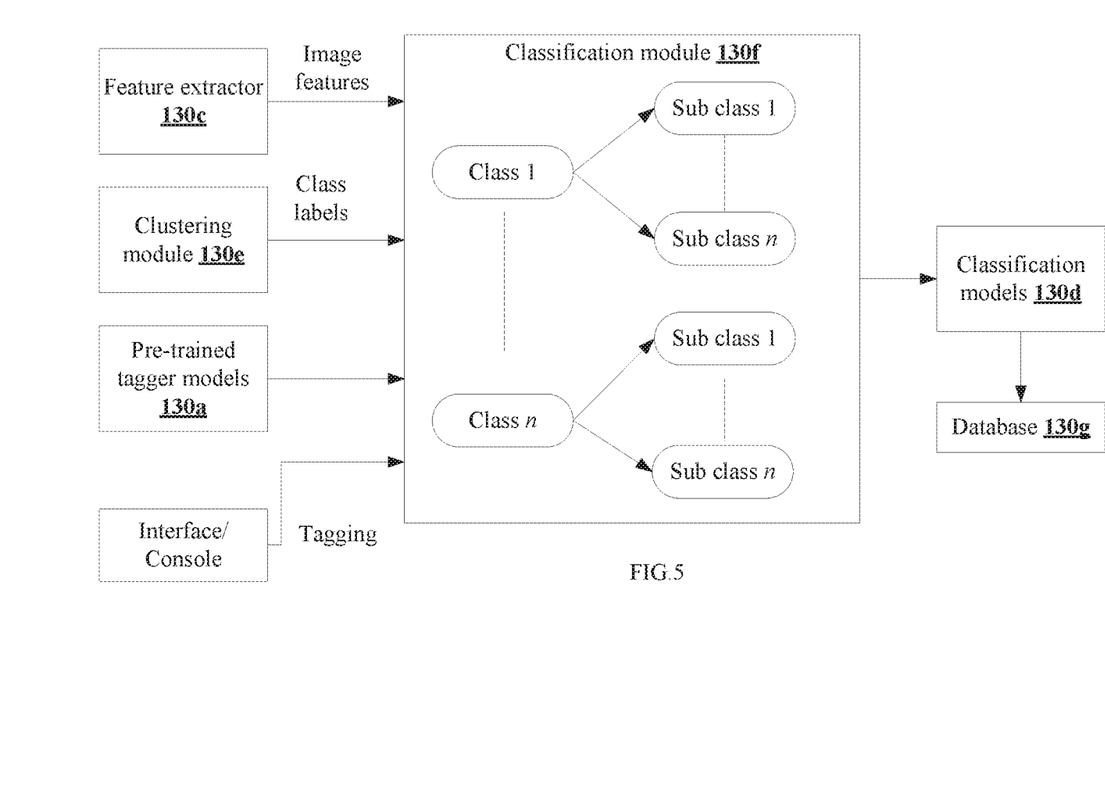
FIG. 5 illustrates an exemplary block diagram illustrating the method flow involved in the step of a second level of inferencing, in accordance with an embodiment of the present disclosure.
Figure 6:
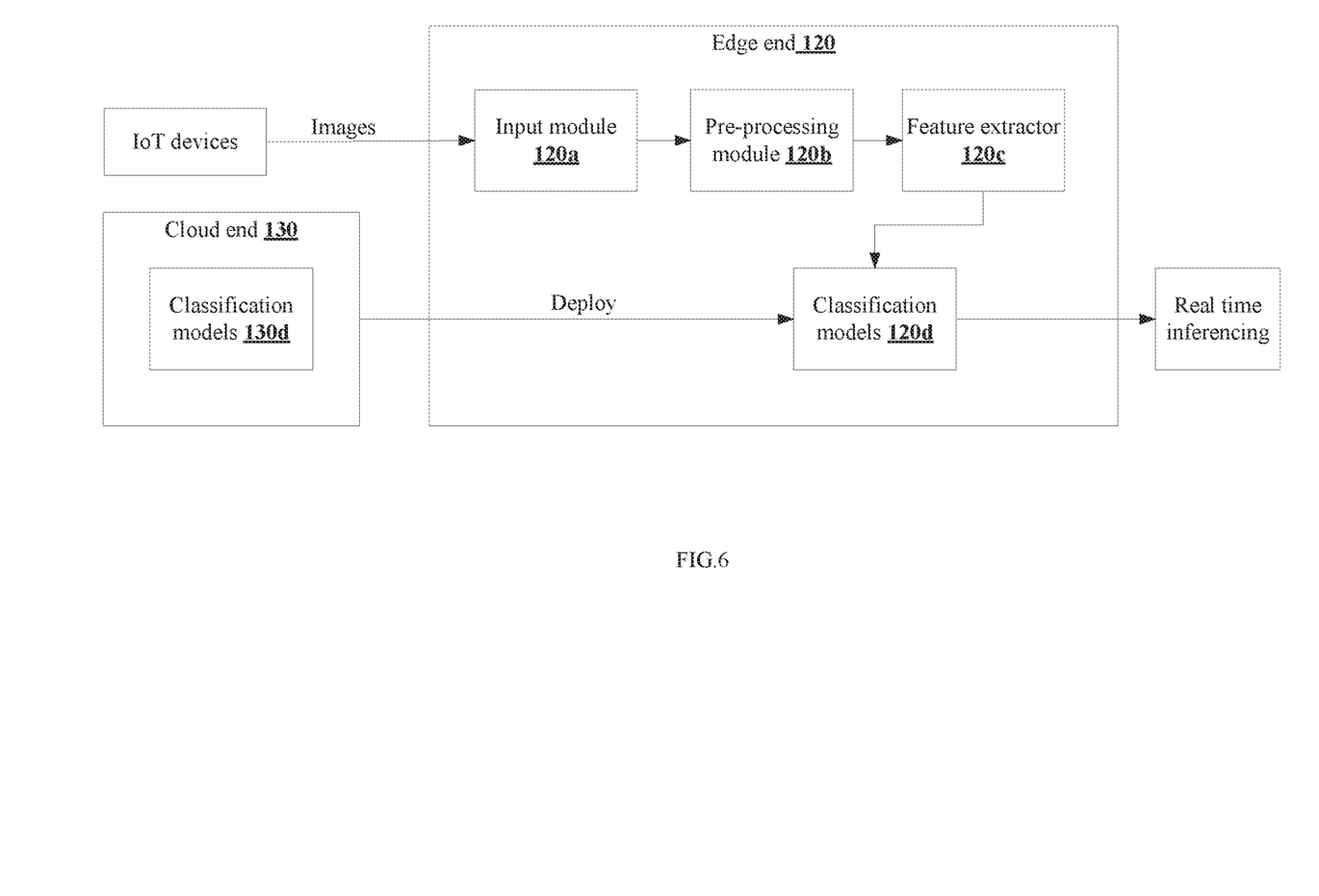
FIG. 6 illustrates an exemplary block diagram representing deployment of classification models on the edge of the cloud-edge topology of FIG. 1 and subsequent inferencing, in accordance with an embodiment of the present disclosure.
Figure 7:
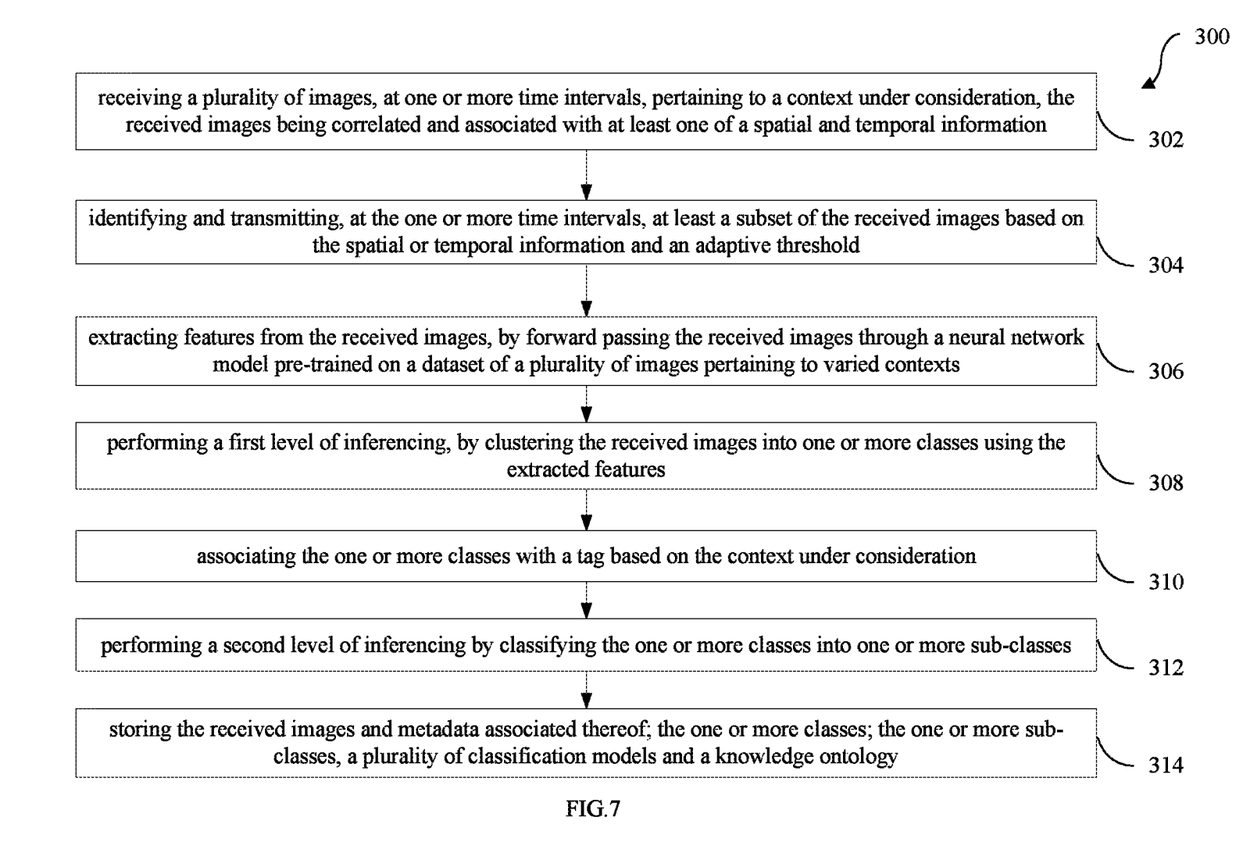
FIG. 7 is an exemplary flow diagram illustrating a computer implemented method for automated inferencing of changes in spatio-temporal images, in accordance with an embodiment of the present disclosure.

FIG. 7 is an exemplary flow diagram illustrating a computer implemented method 300 for automated inferencing of changes in spatio-temporal images, in accordance with an embodiment of the present disclosure. The steps of the method 300 will now be explained in detail with reference to the components of the system 200 of FIG. 2 and details presented in FIGS. 3 through 6, wherein FIG. 3 illustrates an exemplary block diagram of the functional modules implemented at the cloud end of the system of FIG. 2 and their interconnections, in accordance with an embodiment of the present disclosure; FIG. 4 illustrates an exemplary block diagram illustrating the method flow involved in the step of performing a first level of inferencing, in accordance with an embodiment of the present disclosure; FIG. 5 illustrates an exemplary block diagram illustrating the method flow involved in the step of a second level of inferencing, in accordance with an embodiment of the present disclosure; and FIG. 6 illustrates an exemplary block diagram representing deployment of classification models on the edge of the cloud-edge topology of FIG. 1 and subsequent inferencing, in accordance with an embodiment of the present disclosure. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In an embodiment of the present disclosure, the system 200 of the present disclosure as illustrated in FIG. 2 is configured in the cloud-edge topology 100 as illustrated in FIG. 1, wherein an edge end of the cloud-edge topology 100 is generally represented by the reference numeral 120 and a cloud end of the cloud-edge topology 100 is generally represented by the reference numeral 130, a network 110 connecting the edge end 120 to the cloud end 130. In an embodiment, the cloud-edge topology 100 may be an IoT implementation. One or more edge end devices, each pertaining to a context under consideration and generally represented as Edge 1, . . . Edge n may be configured at the edge end 120. Likewise, one or more cloud end devices generally represented as System 1, . . . System n may be configured at the cloud end 130. The exemplary functional modules constituting the system 200 may include an input module 120a that may serve as an IoT gateway bridging the communication gap between IoT devices and the cloud end 130. A clustering module (130e), a classification module (130f), pre-trained tagger models (130a) and a database (130g) may be implemented as cloud end devices. A pre-processing module (120b) may be implemented both as a cloud end device as well as the edge end device. A feature extractor (130c) and classification models (130d) may be implemented as cloud end devices and then are deployed on the edge end (120c, 120d) such that the edge end is updated with a current version of the cloud end devices.

The illustrated distributed framework enables effective learning and filtering of redundant images received at the edge end 120 of the IoT implementation and improving efficiency of the system. As execution on the edge end is a part of the framework, real time inference of a received image can be obtained on the edge end 120 even in absence of connectivity and the images can be uploaded on to the cloud end 130 whenever data connectivity is available. Besides facilitating real time inferencing, the distributed framework also regulates traffic to the cloud end 130.

It may be understood by one skilled in the art that although the distributed framework is a preferred framework for real time inferencing and managing traffic, the functional modules of the present disclosure may be integrated into a single processing system.

Accordingly, in an embodiment of the present disclosure, the input module 120a may be configured to receive, at step 302, a plurality of images, at one or more time intervals, pertaining to a context under consideration, say the agricultural context. The images received at the edge end 120 are correlated and associated with at least one of a spatial and temporal information. The images may be captured from camera sensors installed in a field associated with the context under consideration. The images may also be obtained as part of participatory sensing applications. In an embodiment, at least some metadata may be associated with the received images. Since images would largely be obtained from multiple users/sources where supporting information for the images is likely to be incomplete, the image metadata may be unstructured, incorrect or insufficient. In an embodiment the metadata may be associated by an expert intervention for a limited number of initial iterations in the absence of intelligence at the edge end 120. In an embodiment, an interface or a console may be presented for the expert intervention by a human being or an expert system.

In an embodiment, the input module may be further configured to transmit, at the one or more time intervals, at step 304, at least a subset of the received images based on the spatial or temporal information and an adaptive threshold. In a first iteration, as part of initialization, in the absence of intelligence at the edge end 120, all of the received images may be transmitted to the cloud end 130. Subsequently, as the system 200 self learns and enriches the database 130g on the cloud end 130, the step 304 may also comprise intelligently identifying and transmitting a subset of the received images as explained later in the description.

In an embodiment, the received images and the associated metadata may be stored in the database 130g after being transmitted to the cloud end 130 at step 314.

In an embodiment of the present disclosure, the feature extractor (130c) on the cloud end 130 may be configured to extract features from the received images, at step 306, by forward passing the received images through a neural network model. The present disclosure facilitates leveraging high level robust features extracted using the neural network model. However, unlike conventional systems, wherein the neural network model is pre-trained on a large database of context specific data, in accordance with the present disclosure, the neural network model is pre-trained on a dataset of a plurality of images pertaining to varied contexts, thus making the step 306 of feature extraction agnostic of the domain under consideration. Again, since the neural network model is not trained on a specific dataset, the system 200 is capable of analyzing images of all types, captured through different cameras or images taken in uncontrolled conditions like different brightness, background, with occlusion, and varying angles.

In accordance with an embodiment, the step 306 comprising feature extraction may be preceded by pre-processing of the received images by the pre-processing module (130b) at the cloud end. In an embodiment, the pre-processing may involve performing at least one of (i) a first level of pre-processing, to enhance quality of the received images, by performing one or more of normalization, Principal Components Analysis (PCA) whitening, brightness correction, standardization and segmentation; and (ii) a second level of pre-processing, to adapt the received images for forward passing to the neural network model, by performing one or more of rotation, cropping, shifting, scaling and zooming.

In an embodiment, the feature extractor 130c may be further configured to append the features extracted by the neural network model with additional features such as morphological features and color related features to derive a master feature set. In an embodiment, the master feature set may also be compressed using dimensionality reduction methods.

In accordance with the present disclosure, a hierarchical mode of classification is performed involving a first level of coarse classification that enables identifying stages in the received images and associated characteristics. In the second level of finer classification events maybe identified within each of the identified stages. In an embodiment, classifications may be nested to multiple levels, for instance, finding specific anomalies in the appearance of a crop out of numerous related images thereby enabling varying levels of precision in the inferencing capabilities of the systems and methods of the present disclosure. It may be noted that a cascaded image classification for each class or category gives a better accuracy as compared to a single level of classification for all categories together.

In an embodiment, known clustering methods selected from the group consisting of K-means (KM), mini batch K-means (MBKM), mean shift (MS), affinity propagation (AP), DBSCAN, Agglomerative Clustering (AC) and BIRCH may be employed for clustering. However, the known methods may not provide efficient clustering as known in the art since the neural network model is trained on varied contexts in accordance with the present disclosure and may result in very large dimensions of extracted features making the clustering inefficient. The large dimensions of extracted features also obviate use of linear distance measures for detecting similarity. In accordance with the present disclosure, a spherical distance measure is therefore employed as explained herein below.

Therefore, in an embodiment of the present disclosure, the clustering module 103e may be configured to perform a first level of inferencing, at step 308, by clustering the received images into one or more classes using the extracted features by a method wherein firstly, at step 308a, an optimal number of classes are determined using a Silhouette coefficient. The one or more classes are then identified, at step 308b, based on similarity detected between the received images. In an embodiment, similarity detection involves performing at least one of three steps 308b-1, step 308b-2 and step 308b-3. As part of initialization, in a first iteration, the similarity detection is based on a first distance measure represented by a spherical distance of each of the received images with every other image in the received images is computed at step 308b-1. In subsequent iterations, as new image(s) are received, at least one of 308b-2 and step 308b-3 may be performed, wherein at step 308b-2, a likelihood of each image in the received images belonging to a class using a class distribution based on a Maximum A Posteriori probability (MAP) is computed; and at step 308b-3, a second distance measure represented by a spherical distance between each of the received images and a centroid of each of the one or more classes identified in step 308b-1 is computed. Computation of the second distance measure at step 308b-3 eliminates need for addressing each image individually and deals with only the centroid of the one or more classes, thereby reducing processing time and making the method efficient. In accordance with the present disclosure, the number of the one or more classes equals the determined optimal number at step 308a. In an embodiment, the clustering module 103e may be configured to perform the first level of inferencing within one or more of the one or more classes as part of the nested levels of clustering stated herein above. For example, the images of different growth stages of a particular crop, for instance, seedling, stem extension, vegetative phase, budding, flowering, fruit, ripening, wilting, drying, etc. each clustered into a class can be further classified for events like disease/pest identification. The step 308 of clustering may also flag a new class in the absence of similarity between the extracted features of the received images and the features associated with the one or more classes identified at step 308b-1.

In accordance with the present disclosure, once the first level of inferencing is performed at step 308, quality associated with the identified one or more classes is validated, at step 308c, by using one or more of an Normalized Mutual Information (NMI) score, a Rand Index and a purity measure. If the validity check fails, the one or more classes may be re-clustered. Re-clustering may also be initiated when new image(s) are received and neither the likelihood computed at step 308b-2 nor the second distance measure computed at step 308b-3 provide a clear indication to facilitate clustering.

In contrast with conventional approaches that involve use of neural network models for supervised classification, the unsupervised approach of clustering, in accordance with the present disclosure, eliminates need for cumbersome image labelling of the received images that typically is dependent on human intervention.

In an embodiment of the present disclosure, the interface or the console may be presented, at step 310, for expert intervention by a human being or an expert system for tagging the one or more classes based on the context under consideration. It may be noted that this intervention may be needed only during initialization. The metadata associated with the received images may be updated based on the associated tags.

In an embodiment of the present disclosure, the classification module 130f may be configured to perform a second level of inferencing, at step 312, by classifying the one or more classes into one or more sub-classes. For the finer classification, a plurality of pre-trained tagger models 130a pertaining to the context under consideration is obtained at step 312a. The pre-trained tagger models 130a are associated with one or more sub-classes corresponding to one or more classes pertaining to the context under consideration and are trained by the same master feature set extracted before the step 308 of clustering explained above. Again, pre-training of the tagger models 130a involves using a limited set of context specific images, wherein the set of images may be part of the received images at the input module 120a. The pre-trained tagger models 130a facilitate classifying of the one or more classes identified in the first level of classification into the one or more sub-classes at step 312b. In an embodiment, a confidence level may be computed for the classified one or more sub-classes, at step 312c, based on which the pre-trained tagger models 130a may be re-trained, at step 312d, using the images associated with the confidence level below a pre-defined threshold. The re-trained tagger models represent the classification models 130d. The re-training and associated self-learning makes the system 200 intelligent and adaptable to computer vision requirements with minimal human intervention that occurs only in the initial iterations. In an embodiment of the present disclosure, the interface or the console presented, at step 310, for expert intervention by a human being or an expert system may involve tagging the one or more sub-classes associated with the one or more classes based on the context under consideration. After a few iterations, and re-training, expert validation and tagging may not be needed and the received images maybe auto tagged by the system 200 and the associated metadata may also be updated in the database 130g. Thus it may be noted that the plurality of pre-trained tagger models 130a can collectively capture an entire taxonomy of the context under consideration.

In an embodiment, the classification module 130f may be further configured to evaluate the received images associated with the confidence level below the pre-defined threshold with the obtained metadata prior to re-training the pre-trained tagger models 130a at step 312d to ensure a valid reason for re-training based on expert tagging.

In an embodiment, the classification module 130f may be further configured to create a knowledge ontology, at step 312e, based on the one or more classes, the one or more sub-classes therein and their inter-relationships. Creating a knowledge ontology from the received images by adaptively learning from them enables the systems and methods of the present disclosure to not only classify a received new image but also identify changes in characteristics of an object in the image over a particular space and/or time. The quality of characteristics identified may depend on the level of metadata available for the image. It may be noted that the self-learning and re-training of the pre-trained tagger models 130a contributes to enriching the knowledge model by adding intelligence with each iteration and eliminating dependency on human experts. With regards to the agricultural context under consideration, the classification models for various crops, their growth stages and health conditions available in the form of a comprehensive knowledge ontology help to interpret the crop in captured images using systems and methods of the present disclosure. For example, if a farmer captures an image of a diseased crop through a mobile application, systems of the present disclosure can detect the growth stage of the plant and the disease affected crop within that stage. This in turn can help to suggest necessary remedies that can be implemented to protect the crop. Moreover, while monitoring a crop using camera sensors, the growth cycle and health of the plants in given growth conditions can also be learned. This adds to the knowledge that can be shared with the farmer about how a particular kind of crop grows and in what conditions.

In an embodiment, the one or more classes, the one or more sub-classes, the plurality of classification models and the knowledge ontology may be stored on the database 130g as part of the step 314, wherein the received images and the associated metadata were stored.

As part of the distributed framework, when the system 200 is implemented in the cloud-edge topology, the feature extractor 130c and the classification models 130d on the cloud end 130 are deployed on the edge end as the feature extractor 120c and the classification models 120d to ensure that current versions of these functional modules are available at the edge end 120 for real time inferencing on the edge for the received images without dependency on the connectivity between the edge end 120 and the cloud end 130.

The updated functional modules at the edge end 120 provides the intelligence to the input module 120a to enable intelligent identification and transmitting of a subset of the received images to the cloud end 130 in subsequent iterations. The intelligent identification firstly involves determining whether the received images are valid based on an entropy value associated with the received images. The valid received images are then compared with a pre-determined number of previous images to determine whether the received images fit into the one or more sub-classes associated with the previous images, wherein the pre-determined number of previous images is the adaptive threshold based on the context under consideration.

Conventionally, different methods of classification are known, but systems and methods of the present disclosure facilitate classifying and tagging the images in the database with minimal labeling and expert intervention, yet with higher accuracy. Human expert intervention for tagging may be invoked only in the initial iterations and that too for a limited set of images, post which self-learning and re-training of the pre-trained tagger modules provide adaptive capabilities to the systems and methods of the present disclosure. Systems and methods of the present disclosure facilitate automatically acquiring of images, classifying the images in a hierarchical manner, self-learning and re-training using a certain combination of unsupervised clustering and supervised classifying to categorize and appropriately label a large number of images, thereby providing accurate, scalable and efficient systems and methods for automated inferencing of spatio-temporal images.

Valuation Results

In reference to the existing methods related broadly to "classification using CNN", following experiments demonstrate that the method of hierarchical cluster based classification of the present disclosure using features extracted from CNN performs accurately.

The image dataset used for the comparative study consists of 10 classes.
1. Citrus fruit—brown spots
2. Citrus fruit—white spots
3. Citrus leaves—yellowing
4. Citrus trunks—Gummosis
5. Grape leaves—healthy
6. Grape leaves—yellowing
7. Tea leaves—Black spots
8. Tea leaves—Brown spots
9. Tea leaves—healthy
10. Tea leaves—pest infested The dataset used for performing the comparative study is same for all the methods under consideration.

The method of the present disclosure involves clustering (unsupervised classification) of images using features from a pre-trained CNN as against prior art. The comparison of results provided below is therefore between the supervised classification approaches using CNN and the method of the present disclosure.

Method 1 (prior art): Train a CNN with contextual, labelled image-set for classification of images into pre-determined number of classes (all possible classes, single level classification).

Method 2 (modified version of the present disclosure with a single level of classification): Extract features from pre-trained CNN (agnostic of the context) and use a classifier to classify images in all the pre-determined number of sub-classes (all possible classes, single level classification)

Method 3 (present disclosure): Extract features from pre-trained CNN (agnostic of the context), cluster the images into broad classes and further classify each cluster into its sub-classes.

The amount of data used in the first iteration of the system/method of the present disclosure is 243 images out of which 218 images are used to train and validate the classification system and 25 images are used to test the system/method of the present disclosure.

Results:

Method 1(prior art): Trained a CNN model on the mentioned dataset. Classification accuracy: 52%

Confusion Matrix:

Labels: browning citrus, citrus leaves, grape diseased, grape healthy, tea black spots, tea brown spots, tea healthy, tea pest, trunks gummosis, white citrus.

[[1 0 1 0 0 1 0 0 1 0]
[0 1 0 0 0 0 0 0 0 0]
[0 0 3 0 1 0 0 0 1 0]
[0 0 0 3 0 0 0 0 0 0]
[0 0 0 0 2 0 0 0 0 0]
[0 0 1 0 0 1 0 0 0 0]
[0 1 0 0 0 0 0 0 1 0]
[0 0 1 0 0 0 0 0 0 0]
[0 0 0 0 0 0 0 0 2 1]
[0 0 2 0 0 0 0 0 0 0]]

Classification Report:

| Class No. | Classes | Precision | Recall | F1-score | support |
|---|---|---|---|---|---|
| 1 | browning citrus | 1.00 | 0.25 | 0.40 | 4 |
| 2 | citrus leaves | 0.50 | 1.00 | 0.67 | 1 |
| 3 | grape diseased | 0.38 | 0.60 | 0.46 | 5 |
| 4 | grape healthy | 1.00 | 1.00 | 1.00 | 3 |
| 5 | tea black spots | 0.67 | 1.00 | 0.80 | 2 |
| 6 | tea brown spots | 0.50 | 0.50 | 0.50 | 2 |
| 7 | tea pest | 0 | 0 | 0 | 2 |
| 8 | trunks gummosis | 0.40 | 0.67 | 0.5 | 3 |
| 9 | white citrus | 0 | 0 | 0 | 2 |
| | avg/total | 0.52 | 0.52 | 0.47 | 25 |

The CNN classifier in Method-1 gives low accuracy as the amount of data is less resulting into overfitting.

Method 2 (modified version of the present disclosure with a single level of classification): For features extracted from CNN, the classifier was trained to classify the data into 10 known classes.

Classification accuracy: 80%

Confusion Matrix:

Labels: browning citrus, citrus leaves, grape diseased, grape healthy, tea black spots, tea brown spots, tea healthy, tea pest, trunks gummosis, white citrus.

[[1 0 0 0 0 0 0 0 0 0]
[0 1 0 0 0 0 0 0 0 0]
[0 0 3 0 0 0 0 0 0 0]
[0 0 2 6 0 0 0 0 0 0]
[0 1 0 0 2 0 0 0 0 0]
[0 0 0 0 1 1 0 1 0 0]
[0 0 0 0 0 0 0 0 0 0]
[0 0 0 0 0 0 0 1 0 0]
[0 0 0 0 0 0 0 0 4 0]
[0 0 0 0 0 0 0 0 0 1]]

| Class No. | Classes | Precision | Recall | F1-score | support |
|---|---|---|---|---|---|
| 1 | browning citrus | 1.00 | 1.00 | 1.00 | 1 |
| 2 | citrus leaves | 0.50 | 1.00 | 0.67 | 1 |
| 3 | grape diseased | 0.60 | 1.00 | 0.75 | 3 |
| 4 | grape healthy | 1.00 | 0.75 | 0.86 | 8 |
| 5 | tea black spots | 0.67 | 0.67 | 0.67 | 3 |
| 6 | tea brown spots | 1.00 | 0.33 | 0.50 | 3 |
| 7 | tea pest | 0.50 | 1.00 | 0.67 | 1 |
| 8 | trunks gummosis | 1.00 | 1.00 | 1.00 | 4 |
| 9 | white citrus | 1.00 | 1.00 | 1.00 | 1 |
| | avg/total | 0.87 | 0.80 | 0.80 | 25 |

From the results, it may be noted that, there is misclassification between the leaves of the same plant having different disease/health condition. It may be inferred that a single level classification is not able to differentiate minor differences between sub-classes of same kind of leaves/fruits.

Method 3 (present disclosure):

Classification accuracy: 93.75%

Confusion Matrix:

| | Tea Black spots | Tea Brown spots | Tea Brown spots | Tea pest |
|---|---|---|---|---|
| Tea Black spots | 3 | 0 | 0 | 0 |
| Tea Brown spots | 0 | 2 | 0 | 1 |
| Tea Brown spots | 0 | 0 | 2 | 0 |
| Tea pest | 0 | 0 | 0 | 1 |

Classification Report:

| Class No. | Classes | Precision | Recall | F1-score | support |
|---|---|---|---|---|---|
| 1 | Tea Black spots | 1.00 | 1.00 | 1.00 | 3 |
| 2 | Tea Brown spots | 1.00 | 0.80 | 0.89 | 3 |
| 3 | Tea Healthy | 1.00 | 1.00 | 1.00 | 2 |
| 4 | Tea pest | 0.67 | 1.00 | 0.80 | 1 |
| | avg/total | 0.96 | 0.94 | 0.94 | 9 |

The sub-classes identified in the method of the present disclosure provide finer classification to images from the cluster of tea leaves which were incorrectly classified using methods 1 and 2 above as seen from corresponding confusion matrices.

In methods 1 and 2 above, the amount of data required for better accuracy is higher and misclassification noted is due to high inter-class similarity. Moreover, the classifier needs to be re-trained if even a single new class that differs from the existing 10 classes is introduced. Also, while classifying all the classes together, the classification accuracy decreases due to high similarity between some classes (e.g. disease conditions of same crop leaves).

In Method-3 of the present disclosure, the accuracy is comparatively better even when data available initially is lesser. Performing multi-level classification in the form of a coarse first level clustering into classes and further finer classification into sub-classes improves the obtained accuracy. Moreover, as the cluster wise classifiers are independent of each other, if a new class has to be introduced, only a classifier of the images belonging to sub-classes of that cluster needs to be trained, instead of re-training the whole classification system unlike methods 1 and 2 known in the art.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method (300) comprising:
    receiving a plurality of images, at one or more time intervals, pertaining to a context under consideration, the received images being correlated and associated with at least one of a spatial and temporal information (302);
    identifying and transmitting, at the one or more time intervals, at least a subset of the received images based on the spatial or temporal information and an adaptive threshold (304);
    extracting features from the received images, by forward passing the received images through a neural network model pre-trained on a dataset of a plurality of images pertaining to varied contexts (306), wherein the step of extracting features from the received images is preceded by a step of pre-processing comprising at least one of (i) a first level of pre-processing, to enhance quality of the received images, by performing one or more of normalization, Principal Components Analysis (PCA) whitening, brightness correction, standardization and segmentation; and (ii) a second level of pre-processing, to adapt the received images for forward passing to the neural network model, by performing one or more of rotation, cropping, shifting, scaling and zooming;
    performing a first level of inferencing (308), by clustering the received images into one or more classes using the extracted features, the step of clustering comprising:
        determining an optimal number of the one or more classes using a Silhouette coefficient (308*a*);
        identifying the one or more classes based on similarity detected between the received images (308*b*) by performing at least one of:
            computing a first distance measure represented by a spherical distance of each of the received images with every other image in the received images (308*b*-1);
            computing a likelihood of each image in the received images to belong to a class using a class distribution based on a Maximum A Posteriori probability (MAP) (308*b*-2); and
            computing a second distance measure represented by a spherical distance between each of the received images and a centroid of each of the one or more classes (308*b*-3);
        wherein the number of the one or more classes equals the determined optimal number; and validating the quality of the one or more classes using one or more of an Normalized Mutual Information (NMI) score, a Rand Index and a purity measure (308c); and associating the one or more classes with a tag based on the context under consideration (310).

2. The processor implemented method of claim 1, wherein the step of receiving comprises obtaining at least some metadata associated with the received images; and updating the metadata associated with the received images based on the associated tags.

3. The processor implemented method of claim 2, wherein the step of extracting features from the received images comprises one or more of appending the features extracted by the neural network model, with additional features including morphological features and color related features to derive a master feature set; and compressing the master feature set using dimensionality reduction methods.

4. The processor implemented method of claim 3, further comprising the step of performing a second level of inferencing by classifying the one or more classes into one or more sub-classes (312), the step of classifying comprising:

obtaining a plurality of pre-trained tagger models associated with one or more sub-classes corresponding to one or more classes pertaining to the context under consideration, wherein the pre-trained tagger models are trained by the master feature set (312a);

classifying the one or more classes from the first level of inferencing into the one or more sub-classes based on the plurality of pre-trained tagger models (312b);

computing a confidence level for the classified one or more sub-classes (312c);

re-training the plurality of pre-trained tagger models with the received images associated with the confidence level below a pre-defined threshold to obtain a plurality of classification models (312d); and creating a knowledge ontology of the classifications models based on the one or more classes, the one or more sub-classes therein and the inter-relationships thereof (312e).

5. The processor implemented method of claim 4, wherein the step of re-training the plurality of pre-trained tagger models is preceded by evaluating the received images associated with the confidence level below the pre-defined threshold with the associated metadata.

6. The processor implemented method of claim 5 further comprising storing the received images and the metadata associated thereof; the one or more classes; the one or more sub-classes, the plurality of classification models and the knowledge ontology (314).

7. The processor implemented method of claim 6, wherein the step of identifying and transmitting at least a subset of the received images comprises performing one or more of:

determining whether the received images are valid based on an entropy value associated thereof; and comparing the received images with a pre-determined number of previous images to determine whether the received images fit into the one or more sub-classes associated thereof, wherein the pre-determined number of previous images is the adaptive threshold based on the context under consideration.

8. The processor implemented method of claim 1, wherein the step of performing the first level of inferencing is performed within one or more of the one or more classes.

9. A system (200) comprising:

one or more internal data storage devices operatively coupled to one or more hardware processors for storing instructions configured for execution by the one or more hardware processors, the instructions being comprised in:

an input module (120a) configured to:

receive a plurality of images, at one or more time intervals, pertaining to a context under consideration, the received images being correlated and associated with at least one of a spatial and temporal information; and identify and transmit, at the one or more time intervals, at least a subset of the received images based on the spatial or temporal information and an adaptive threshold;

a pre-processing module (120b, 130b) configured to pre-process the received images, by performing at least one of (i) a first level of pre-processing, to enhance quality of the received images, by performing one or more of normalization, Principal Components Analysis (PCA) whitening, brightness correction, standardization and segmentation; and (ii) a second level of pre-processing, to adapt the received images for forward passing to the neural network model, by performing one or more of rotation, cropping, shifting, scaling and zooming;

a feature extractor (120c, 130c) configured to extract features from the received images, by forward passing the received images through a neural network model pre-trained on a dataset of a plurality of images pertaining to varied contexts;

a clustering module (130e) configured to perform a first level of inferencing by clustering the received images into one or more classes using the extracted features, the step of clustering comprising:

determining an optimal number of the one or more classes using a Silhouette coefficient;

identifying the one or more classes based on similarity detected between the received images by performing at least one of:

computing a first distance measure represented by a spherical distance of each of the received images with every other image in the received images;

computing a likelihood of each image in the received images to belong to a class using a class distribution based on a Maximum A Posteriori probability (MAP); and computing a second distance measure represented by a spherical distance between each of the received images and a centroid of each of the one or more classes;

wherein the number of the one or more classes equals the determined optimal number; and validating the quality of the one or more classes using one or more of an Normalized Mutual Information (NMI) score, a Rand Index and a purity measure; and associating the one or more classes with a tag based on the context under consideration.

10. The system of claim 9, wherein the input module is further configured to obtain at least some metadata associated with the received images; and update the metadata associated with the received images based on the associated tags.

11. The system of claim 9, wherein the feature extractor is further configured to append the features extracted by the neural network model, with additional features including morphological features and color related features to derive a master feature set; and compress the master feature set using dimensionality reduction methods.

12. The system of claim 11 further comprising a classification module (130f) configured to perform a second level of inferencing by classifying the one or more classes into one or more sub-classes, the step of classifying comprising:
  obtaining a plurality of pre-trained tagger models (130a) associated with one or more sub-classes corresponding to one or more classes pertaining to the context under consideration, wherein the pre-trained tagger models are trained by the master feature set;
  classifying the one or more classes from the first level of inferencing into the one or more sub-classes based on the plurality of pre-trained tagger models;
  computing a confidence level for the classified one or more sub-classes;
  re-training the plurality of pre-trained tagger models with the images associated with the confidence level below a pre-defined threshold to obtain a plurality of classification models (120d, 130d); and
  creating a knowledge ontology of the classifications models based on the one or more classes, the one or more sub-classes therein and the inter-relationships thereof.

13. The system of claim 12, wherein the classification module is further configured to evaluate the received images associated with the confidence level below the pre-defined threshold with the associated metadata, prior to re-training the pre-trained tagger models.

14. The system of claim 13 further comprising a database (130g) configured to store the received images and the metadata associated thereof; the one or more classes; the one or more sub-classes, the plurality of classification models and the knowledge ontology.

15. The system of claim 14, wherein the input module is further configured to identify and transmit at least a subset of the received images by performing one or more of:
  determining whether the received images are valid based on an entropy value associated thereof; and
  comparing the received images with a pre-determined number of previous images to determine whether the received images fit into the one or more sub-classes associated thereof, wherein the pre-determined number of previous images is the adaptive threshold based on the context under consideration.

16. The system of claim 15, wherein the system is configured in a cloud-edge topology (100) having (i) the input module (120a) serving as an IoT gateway; (ii) the clustering module (130e), the classification module (130f), the pre-trained tagger models (130a) and the database (130g) are implemented as cloud (130) based devices; (iii) the pre-processing module (120b) is implemented both as a cloud end device as well as an edge (120) end device; and (iv) the feature extractor (120c, 130c) and the classification models (120d, 130d) are implemented as cloud end devices and are deployed on the edge end such that the edge end is updated with a current version thereof.

17. The system of claim 9, wherein the clustering module is further configured to perform the first level of inferencing within one or more of the one or more classes.

18. A computer program product comprising a non-transitory computer readable medium having a computer readable program embodied therein, wherein the computer readable program, when executed on a computing device, causes the computing device to:
  receive a plurality of images, at one or more time intervals, pertaining to a context under consideration, the received images being correlated and associated with at least one of a spatial and temporal information;
  identify and transmit, at the one or more time intervals, at least a subset of the received images based on the spatial or temporal information and an adaptive threshold;
  extract features from the received images, by forward passing the received images through a neural network model pre-trained on a dataset of a plurality of images pertaining to varied contexts, wherein the step of extracting features from the received images is preceded by a step of pre-processing comprising at least one of (i) a first level of pre-processing, to enhance quality of the received images, by performing one or more of normalization, Principal Components Analysis (PCA) whitening, brightness correction, standardization and segmentation; and (ii) a second level of pre-processing, to adapt the received images for forward passing to the neural network model, by performing one or more of rotation, cropping, shifting, scaling and zooming;
  perform a first level of inferencing, by clustering the received images into one or more classes using the extracted features, wherein clustering is performed by:
    determining an optimal number of the one or more classes using a Silhouette coefficient;
    identifying the one or more classes based on similarity detected between the received images by performing at least one of:
      computing a first distance measure represented by a spherical distance of each of the received images with every other image in the received images;
      computing a likelihood of each image in the received images to belong to a class using a class distribution based on a Maximum A Posteriori probability (MAP); and
      computing a second distance measure represented by a spherical distance between each of the received images and a centroid of each of the one or more classes;
    wherein the number of the one or more classes equals the determined optimal number; and
    validating the quality of the one or more classes using one or more of an Normalized Mutual Information (NMI) score, a Rand Index and a purity measure; and
  associating the one or more classes with a tag based on the context under consideration.

* * * * *